(12) United States Patent
Kadambala et al.

(10) Patent No.: US 11,678,042 B2
(45) Date of Patent: Jun. 13, 2023

(54) IN-DISPLAY CAMERA ACTIVATION

(71) Applicant: QUALCOMM Incorporated, San Diego, CA (US)

(72) Inventors: Ravi Shankar Kadambala, Hyderabad (IN); Bapineedu Chowdary Gummadi, Hyderabad (IN); Soman Ganesh Nikhara, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/160,007

(22) Filed: Jan. 27, 2021

(65) Prior Publication Data

US 2022/0239814 A1 Jul. 28, 2022

(51) Int. Cl.
*H04N 5/225* (2006.01)
*G09G 3/36* (2006.01)
*H04N 23/57* (2023.01)

(52) U.S. Cl.
CPC ............ *H04N 23/57* (2023.01); *G09G 3/36* (2013.01)

(58) Field of Classification Search
CPC ....... G09G 2320/0686; G09G 2354/00; G09G 3/36; G09G 3/3644; H04N 5/2257
See application file for complete search history.

(56) References Cited

U.S. PATENT DOCUMENTS

| 10,848,647 | B1* | 11/2020 | Bellomo | H04N 23/66 |
| 11,062,109 | B2* | 7/2021 | Shi | G06V 40/1318 |
| 2017/0061210 | A1* | 3/2017 | Ollila | H04N 1/00307 |
| 2017/0251137 | A1* | 8/2017 | Evans, V | G02F 1/1368 |
| 2020/0120259 | A1* | 4/2020 | Sugiyama | H04N 23/65 |

FOREIGN PATENT DOCUMENTS

| CN | 111405090 A | 7/2020 |
| EP | 3618050 A2 | 3/2020 |

OTHER PUBLICATIONS

International Search Report and Written Opinion—PCT/US2022/013594—ISA/EPO—dated Apr. 29, 2022.

* cited by examiner

*Primary Examiner* — Amy R Hsu
(74) *Attorney, Agent, or Firm* — Qualcomm Incorporated

(57) ABSTRACT

Methods, systems, and devices for in-display camera activation are described. The method includes receiving a request to activate a camera of the device, identifying a start of frame marker associated with activating the camera in response to the request, and emitting a signal to a display of the device in response to the identified start of frame marker, where the emitted signal triggers the display to transition a set of liquid crystal elements of the display from a display mode to a camera mode for camera operation.

23 Claims, 12 Drawing Sheets

IN-DISPLAY CAMERA ACTIVATION

BACKGROUND

The following relates to in-display camera activation, including in-display camera activation.

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices.

Image capturing systems devices are commonly incorporated into a wide variety of devices (e.g., digital cameras, smart phone cameras, cellular phone cameras, satellite radio phone cameras, video cameras, tablet computer cameras, laptop cameras, web cameras etc.). Image capturing systems include device configured to capture one or more images (e.g., photographic images, video images, sequence of images, digital images). Image capturing systems. Some image capturing systems may include in-display cameras. Improvements may be desirable in devices with in-display cameras

SUMMARY

The described techniques relate to improved methods, systems, devices, and apparatuses that support in-display camera activation. Generally, the described techniques provide for an image capture device configured with a camera sensor, a display, and one or more processors (e.g., image processor, central processor unit (CPU), mobile station modem, etc.). The camera sensor may be configured to capture images. In some cases, the camera sensor may be configured to receive light through at least a portion of the display. The image capture device, in conjunction with the one or more processors, may be configured to perform one or more operations. In some cases, the image capture device may receive a request to activate a camera of the image capture device. In some cases, image capture device may identify a start of frame marker associated with activating the camera in response to the request. In some cases, image capture device may emit a signal to the display of the image capture device in response to the identified start of frame marker. In some cases, the emitted signal triggers the display to transition a set of liquid crystal elements of the display from a display mode to a camera mode for camera operation. In some cases, the emitted signal may include a general purpose input output signal, or an interrupt signal, or both.

A method of in-display camera activation by a device is described. The method may include receiving a request to activate a camera of the device, identifying a start of frame marker associated with activating the camera in response to the request, and emitting a signal to a display of the device in response to the identified start of frame marker, where the emitted signal triggers the display to transition a set of liquid crystal elements of the display from a display mode to a camera mode for camera operation.

An apparatus for in-display camera activation by a device is described. The apparatus may include a processor, memory coupled with the processor, and instructions stored in the memory. The instructions may be executable by the processor to cause the apparatus to receive a request to activate a camera of the device, identify a start of frame marker associated with activating the camera in response to the request, and emit a signal to a display of the device in response to the identified start of frame marker, where the emitted signal triggers the display to transition a set of liquid crystal elements of the display from a display mode to a camera mode for camera operation.

Another apparatus for in-display camera activation by a device is described. The apparatus may include means for receiving a request to activate a camera of the device, identifying a start of frame marker associated with activating the camera in response to the request, and emitting a signal to a display of the device in response to the identified start of frame marker, where the emitted signal triggers the display to transition a set of liquid crystal elements of the display from a display mode to a camera mode for camera operation.

A non-transitory computer-readable medium storing code for in-display camera activation by a device is described. The code may include instructions executable by a processor to receive a request to activate a camera of the device, identify a start of frame marker associated with activating the camera in response to the request, and emit a signal to a display of the device in response to the identified start of frame marker, where the emitted signal triggers the display to transition a set of liquid crystal elements of the display from a display mode to a camera mode for camera operation.

In some examples of the method, apparatuses, and non-transitory computer-readable medium described herein, the signal may include operations, features, means, or instructions for determining, based on receiving the request to activate the camera of the device, a first direct current voltage level, and emitting, by a camera sensor of the device, the GPIO signal at the first direct current voltage level to trigger the transition of the set of liquid crystal elements.

In some examples of the method, apparatuses, and non-transitory computer-readable medium described herein, an electrical connection of the GPIO signal connects between the camera sensor and a controller or a switch of the display of the device.

In some examples of the method, apparatuses, and non-transitory computer-readable medium described herein, the controller or the switch of the display emits a trigger voltage when the controller or the switch detects the GPIO signal at the first direct current voltage level, where the trigger voltage triggers the transition of the set of liquid crystal elements.

In some examples of the method, apparatuses, and non-transitory computer-readable medium described herein, transitioning the set of liquid crystal elements may include operations, features, means, or instructions for aligning the set of liquid crystal elements in a first orientation that increases transmission of light through the set of liquid crystal elements to the camera sensor when the GPIO signal may be emitted at the first direct current voltage level.

In some examples of the method, apparatuses, and non-transitory computer-readable medium described herein, the set of liquid crystal elements align in a second orientation that decreases transmission of light through the set of liquid crystal elements to the camera sensor when the GPIO signal may be emitted at a second level different from the first direct current voltage level.

In some examples of the method, apparatuses, and non-transitory computer-readable medium described herein, emitting the signal may include operations, features, means, or instructions for generating, by a processor of the device, an interrupt in response to the processor identifying the start of frame marker.

Some examples of the method, apparatuses, and non-transitory computer-readable medium described herein may further include operations, features, means, or instructions for registering the generated interrupt with a camera driver of the camera during initialization of the camera driver, where the camera driver may be initialized after receiving the request to activate the camera and before the camera may be activated.

In some examples of the method, apparatuses, and non-transitory computer-readable medium described herein, emitting the signal to the display of the device may include operations, features, means, or instructions for sending the registered interrupt from the camera driver to a display driver of the display.

In some examples of the method, apparatuses, and non-transitory computer-readable medium described herein, the display driver receiving the registered interrupt triggers the transition of the set of liquid crystal elements.

In some examples of the method, apparatuses, and non-transitory computer-readable medium described herein, the camera may be positioned behind the set of liquid crystal elements, and where a field of view of the camera may be aligned with the set of liquid crystal elements.

DETAILED DESCRIPTION

Figure 1:
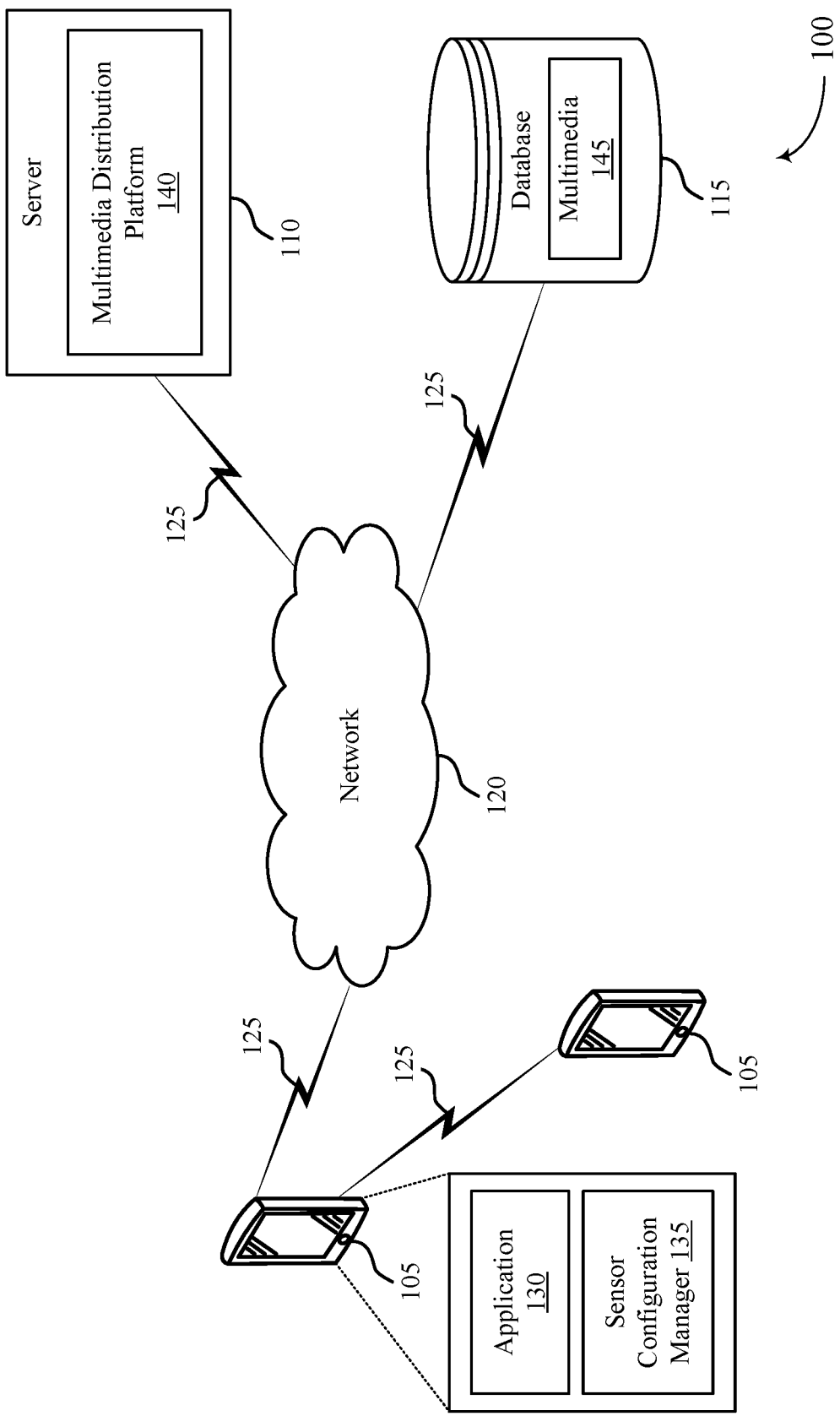
FIG. 1 illustrates an example of a system for in-display camera activation that supports in-display camera activation in accordance with aspects of the present disclosure.

The present techniques include in-display camera activation. The present techniques provide improvements to operations associated with in-display camera systems. Some devices may include an in-display camera where a camera sensor is positioned under a portion of the display of the device (e.g., a portion of pixels of the total pixels of the display). When the display is displaying content the portion of the display over the camera sensor may be used to display the content. When the in-display camera of the device is active, the in-display camera may detect light signals passing through the portion of the display over the camera sensor.

When initializing a camera positioned under the portion of the display, it may be desirable to transition the portion of the display over the camera sensor from a display mode to a camera mode or from a camera mode to a display mode. In some cases, transitioning the portion of the display to a camera mode may include physically transitioning at least some of the pixels of the portion of the display over the camera sensor to improve light transmission through the display to the camera sensor. However, some transitioning processes may include relatively significant delays (e.g., due to processor scheduling issues, etc.).

In some cases, a sequence of camera stack operations in relation to an open/activate camera operation may include one or more operations based on a mobile computing API. In some cases, the camera operations may include a camera open operation (e.g., a request by a process to access the camera), followed by a camera power on operation (e.g., operation to turn on the camera when access is granted), followed by a display pixel open operation (e.g., a display driver call to activate a display of camera-captured pixels), followed by a camera stream on operation (e.g., stream pixels from camera to display). In some cases, the camera power on operation and display pixel open operation may be configured to execute within the shortest interval possible (e.g., at the same time or relatively at the same time) to reduce a camera start up latency, though CPU scheduling delays may increase overall camera latency. In a software stack the camera power on operation and display pixel open operation may be called from a user mobile application to a user mode driver, and from the user mode driver to a kernel mode driver, which may take up to 60 to 70 milliseconds (ms) in relatively high-end devices, or up to 100 ms in relatively low-end devices based on processor scheduling delays. The 60 to 100 ms call transition times result in a delay in camera convergence and preview output.

In some cases, the present techniques provide a hardware mechanism to open the display pixels when the camera powers up to reduce this 60 to 100 ms delay from software stack calls. Thus, the present techniques include replacing a software mechanism with a hardware mechanism. In some cases, the present techniques may include a device generating a signal to trigger the portion of the display over the camera sensor to transition. In some cases, the portion of the display over the camera sensor may include a subset of liquid-crystal elements of the display. In some cases, the present techniques may include a device generating a signal to trigger liquid-crystal elements of a display to transition (e.g., aligned in a given direction) to permit additional light to pass through the display to a camera sensor under the transitioned liquid-crystal elements. In some cases, the generated signal may be triggered by a start of frame marker generated by an image signal processor of the device. In some cases, the generated signal may include a dedicated general purpose input output (GPIO) signal or an interrupt signal (e.g., a CPU interrupt signal), or both. In some cases, the GPIO signal may be emitted from a camera sensor to the display (e.g., to a logical circuit of the display, to a display driver, to a display processor, etc.).

Aspects of the subject matter described herein may be implemented to realize one or more advantages. The described techniques may support improvements in system efficiency associated with a device transitioning the portion of the display over the camera sensor between a display mode and a camera mode. Additionally, described techniques decrease call transition times, which results in faster camera convergence times and faster preview output times. Accordingly, the described techniques result in decreasing system latency and improving user experience.

Aspects of the disclosure are initially described in the context of a multimedia system. Aspects of the disclosure are further illustrated by and described with reference to in-display camera systems, display systems, and block diagrams. Aspects of the disclosure are further illustrated by and described with reference to apparatus diagrams, system diagrams, and flowcharts that relate to in-display camera activation.

FIG. 1 illustrates a multimedia system 100 for a device that supports in-display camera activation in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports in-display camera activation, such as multimedia packets, multimedia data, or multimedia control information, via network 120 using communications links 125. In some cases, a portion or all of the techniques described herein supporting in-display camera activation may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a sensor configuration manager 135. While, the multimedia system 100 illustrates the devices 105 including both the application 130 and the sensor configuration manager 135, the application 130 and the sensor configuration manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The sensor configuration manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the sensor configuration manager 135 may process multimedia (e.g., image data, video data, audio data) from and/or write multimedia data to a local memory of the device 105 or to the database 115.

The sensor configuration manager 135 may also be configured to provide multimedia enhancements, multimedia restoration, multimedia analysis, multimedia compression, multimedia streaming, and multimedia synthesis, among other functionality. For example, the sensor configuration manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the sensor configuration manager 135 may process multimedia data to support in-display camera activation, according to the techniques described herein.

The server 110 may be a data server, a cloud server, a server associated with an multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support in-display camera activation associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The communications links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

In some examples, a display of device 105 may include a first set of liquid crystal elements and a second set of liquid crystal elements. In some cases, the first set of liquid crystal elements may be fixed in place (e.g., fixed in place in a set orientation), while the second set of liquid crystal elements may be configured to transition (e.g., configured to physically move or physically rotate in place). In some cases, a camera of device 105 may be positioned in alignment with the second set of liquid crystal elements. In some cases, device 105, in conjunction with sensor configuration manager 135, may transition the display of device 105 from a first mode to a second mode (e.g., from a display mode to a camera mode). In some cases, the transition of the display may increase an amount of light incident upon a sensor of the camera of device 105.

The techniques described herein may provide improvements in the operations of device 105 and sensor configuration manager 135, resulting in increased system efficiency and improved user experience when device 105 transitions the display of device 105 between a display mode and a camera mode.

Figure 2:
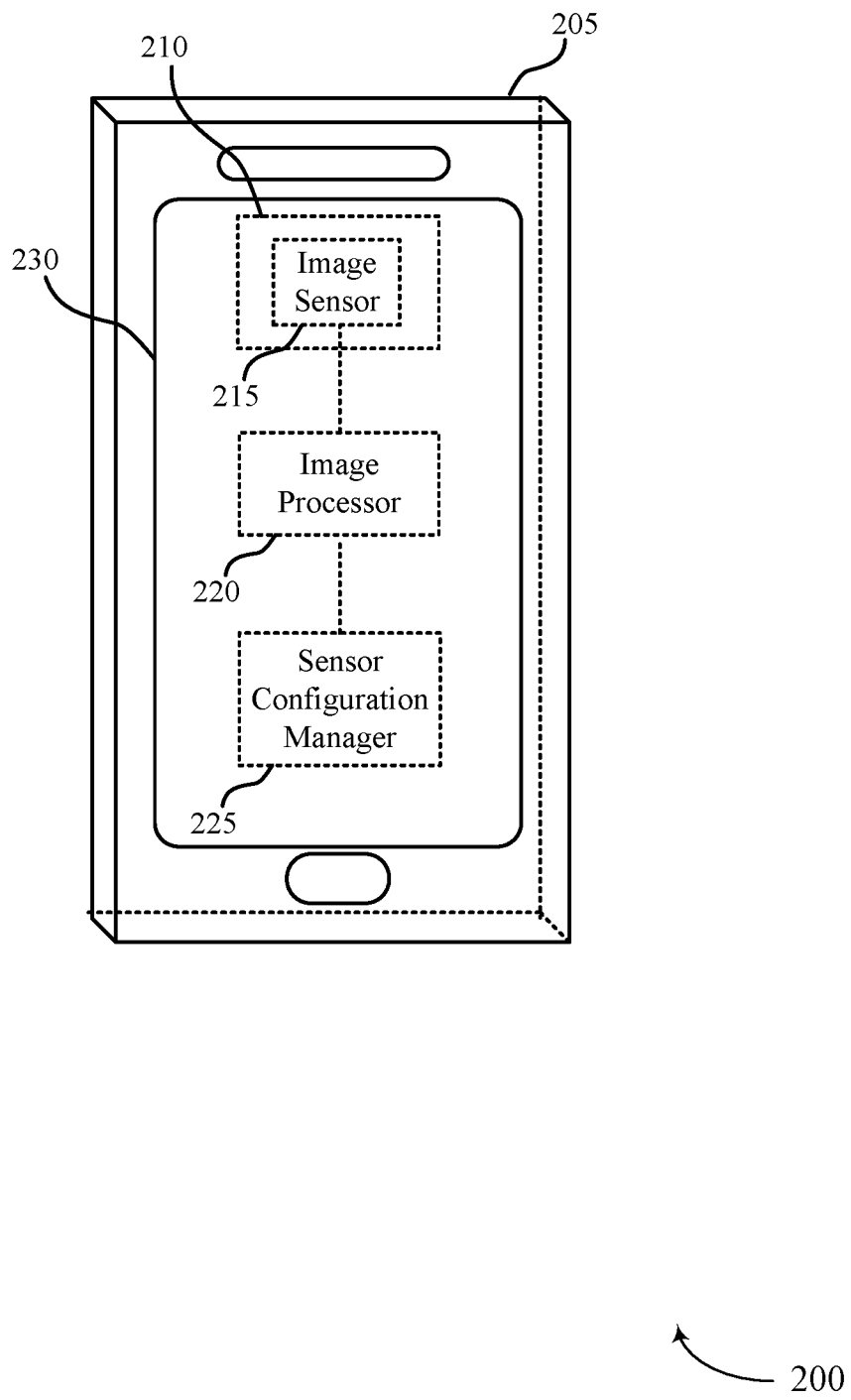
FIG. 2 illustrates an example of an image capture system that supports in-display camera activation in accordance with aspects of the present disclosure.

FIG. 2 illustrates an example of an image capture system 200 that supports in-display camera activation in accordance with aspects of the present disclosure. In some examples, image capture system 200 may implement aspects of multimedia system 100.

In the illustrated example, image capture system 200 includes or is part of a device 205. Examples of device 205 may include a smart phone device, a personal digital assistant, a camera device, a tablet computer, a laptop computer, a desktop computer, a handheld audio recording device, a computer monitor, or any combination thereof. As shown, device 205 may include an image sensor 215 (e.g., a camera sensor), an image processor 220 (e.g., image signal processor) connected to image sensor 215, an sensor configuration manager 225 connected to image processor 220, and display 230 (e.g., display panel to display images captured by image sensor 215, etc.). The sensor configuration manager 225 may be an example of sensor configuration manager 135 of FIG. 1. Although a single image sensor is shown (image sensor 215), in some cases, a front-facing camera may be associated with a first image sensor (e.g., image sensor 215) and a back-facing camera may be associated with a second image sensor, and the first image sensor and the second image sensor may be connected to image processor 220.

In some examples, display 230 may include liquid crystal elements. In some cases, the liquid crystal elements of display 230 may be arranged in a grid of liquid crystal elements. In some cases, display 230 may include transition aperture 210.

In the illustrated example, image sensor 215 may be positioned in relation to transition aperture 210. In some cases, image sensor 215 may be positioned under at least a portion of transition aperture 210. In some cases, transition aperture 210 may include a set of liquid crystal elements that are configured to transition between a display mode (e.g., mode for displaying graphics on display 230) and a camera mode (e.g., mode for capturing images via image sensor 215). In some cases, the set of liquid crystal elements of transition aperture 210 may be a subset of the total liquid crystal elements of display 230.

In some examples, sensor configuration manager 225, in conjunction with image sensor 215 and/or image processor 220, may perform one or more operations described herein. For example, sensor configuration manager 225 may perform one or more operations associated with transitioning a set of liquid crystal elements of display 230 from a first mode to a second mode (e.g., from a display mode to a camera mode).

In some examples, display 230 may include a first set of liquid crystal elements and a second set of liquid crystal elements. In some cases, the first set of liquid crystal elements may be fixed in place (e.g., fixed in place in a set orientation), while the second set of liquid crystal elements may be configured to transition (e.g., configured to physically move or physically rotate in place). In some cases, the transition aperture 210 may include the second set of liquid crystal elements that are configured to transition. Accordingly, when device 205, in conjunction with sensor configuration manager 225, instructs display 230 to transition from a first mode to a second mode, the second set of liquid crystal elements may transition (e.g., physically move) from a first orientation associated with the first mode to a second orientation associated with the second mode, while the first set of liquid crystal elements remain fixed in place. For example, when device 205, in conjunction with sensor configuration manager 225, instructs display 230 to transition from a display mode to a camera mode, the second set of liquid crystal elements may transition (e.g., physically move) from a first orientation associated with the display mode to a second orientation associated with the camera mode, while the first set of liquid crystal elements remain fixed in place.

The operations of sensor configuration manager 225, in conjunction with image sensor 215 or image processor 220, or both, result in increased system efficiency and improved user experience when device 205 transitions the transition aperture 210 between a display mode and a camera mode.

Figure 3:
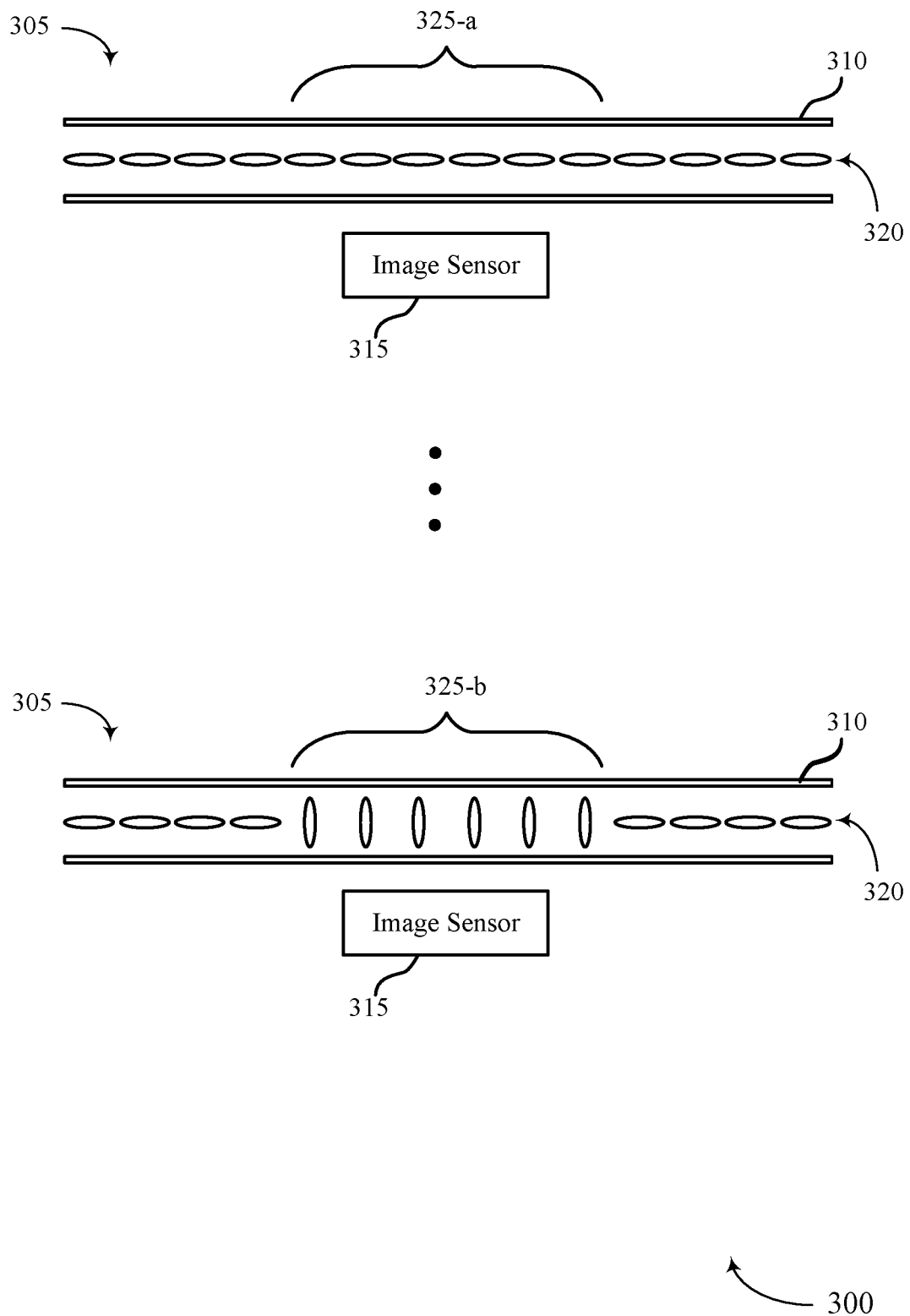
FIG. 3 illustrates an example of a display system that supports in-display camera activation in accordance with aspects of the present disclosure.

FIG. 3 illustrates an example of a display system 300 that supports in-display camera activation in accordance with aspects of the present disclosure. In some examples, display system 300 may implement aspects of multimedia system 100. As illustrated, display system 300 may include a display 305 of a device (e.g., device 205), an outer screen 310 (e.g., outer surface of display 305), image sensor 315, and transition aperture 325-a. As shown, display 305 may include a set of liquid crystal elements 320. In some cases, display 305 may be an example of display 230 of FIG. 2. In some cases, image sensor 315 may be an example of image sensor 215 of FIG. 2. In some cases, transition aperture 325-*a* may be an example of transition aperture 210 of FIG. 2.

In the illustrated example, transition aperture 325-*a* may include a subset of liquid crystal elements of the set of liquid crystal elements 320. As shown, image sensor 315 may be positioned in relation to transition aperture 325-*a*. In some cases, image sensor 315 may be positioned so that a field of view of image sensor 315 is aligned with at least one liquid crystal element of the subset of liquid crystal elements of transition aperture 325-*a*.

In the illustrated example, the subset of liquid crystal elements of transition aperture 325-*a* may be configured to transition between a display mode and a camera mode. In some cases, the subset of liquid crystal elements of transition aperture 325-*a* may transition between display mode and camera mode based on a signal. In some cases, the signal may be generated based on a start of frame marker.

In some examples, the signal may include a general purpose input output (GPIO) signal. In some cases, the GPIO signal may be emitted by image sensor 315. In some cases, the GPIO signal may be emitted by the image sensor in conjunction with an image processor (e.g., image processor 220, sensor configuration manager 225). In some cases, the GPIO signal may be received by a display controller (e.g., a display processor, a display driver, a logical integrated circuit of display 305, etc.).

In some examples, the signal may include an interrupt signal. In some cases, the interrupt signal may be emitted by a processor of the associated device (e.g., image processor 220, sensor configuration manager 225, a CPU of the device, a mobile station modem of the device, etc.). In some cases, the interrupt may be received by a display controller (e.g., a display processor, a display driver, a logical integrated circuit of display 305, etc.).

In some examples, transition aperture 325-*a* depicts the subset of liquid crystal elements in display mode, while transition aperture 325-*b* depicts the subset of liquid crystal elements in camera mode. In some cases, when the display 305 receives the signal the subset of liquid crystal elements of transition aperture 325-*a* in display mode may transition to the subset of liquid crystal elements of transition aperture 325-*b* in camera mode. In some cases, display 305 may transition from camera mode to display mode. In some cases, when display 305 receives a first signal (e.g., a camera trigger signal), the subset of liquid crystal elements of transition aperture 325-*a* in display mode may transition to the subset of liquid crystal elements of transition aperture 325-*b* in camera mode. When display 305 receives a second signal (e.g., a display trigger signal), the subset of liquid crystal elements of transition aperture 325-*b* in camera mode may transition to the subset of liquid crystal elements of transition aperture 325-*a* in display mode. In some cases, the first signal or the second signal may include a GPIO signal, or an interrupt signal, or both.

As shown, when the subset of liquid crystal elements are in the display mode (e.g., transition aperture 325-*a*) the subset of liquid crystal elements align with the other liquid crystal elements of the set of liquid crystal elements 320. When the subset of liquid crystal elements are in the camera mode (e.g., transition aperture 325-*b*) the subset of liquid crystal elements are oriented perpendicular to the other liquid crystal elements of the set of liquid crystal elements 320.

The present techniques reduce call transition times and free up processing cycles of one or more devices (e.g., battery-operated devices, device 205 of FIG. 2, etc.) by emitting a signal that triggers the display to transition between a display mode and a camera mode, thus improving user experience of the one or more devices with improved display/camera transition times, longer battery life, and improved quality of service. The present techniques result in faster camera convergence times and faster preview output times. Accordingly, the described techniques result in decreasing system latency and improving user experience.

Figure 4:
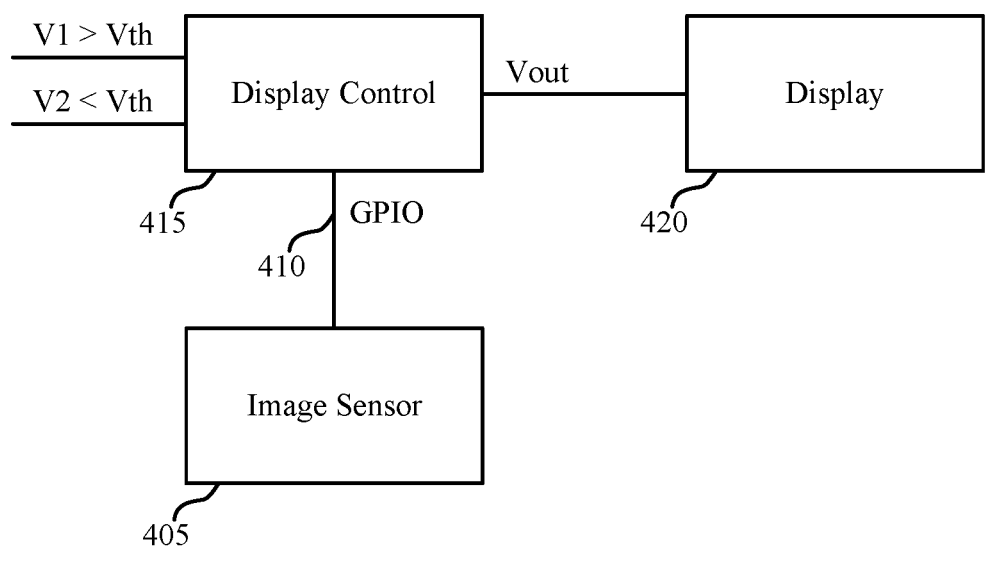
FIG. 4 illustrates an example of a block diagram that supports in-display camera activation in accordance with aspects of the present disclosure.

FIG. 4 illustrates an example of a block diagram 400 that supports in-display camera activation in accordance with aspects of the present disclosure. In some examples, block diagram 400 may implement aspects of multimedia system 100. In the illustrated example, block diagram 400 includes image sensor 405, display control 415, and display 420. In some cases, image sensor 405 may be an example of image sensor 215 of FIG. 2 or image sensor 315 of FIG. 3. In some cases, display 420 may be an example of display 230 of FIG. 2 or display 305 of FIG. 3. In some cases, display control 415 may include a display processor, or a display driver, or a logical integrated circuit of display 420, or any combination thereof. In some cases, display 420 may include at least a portion of display control 415

In some examples, block diagram 400 illustrates an example of a GPIO synchronization mechanism to transition the display pixels when the camera powers on (e.g., transition the subset of liquid crystal elements of the transition aperture). As shown, a GPIO connection 410 may connect between image sensor 405 and display control 415. In some cases, image sensor 405 may generate the GPIO signal and emit the GPIO signal to display control 415 over GPIO connection 410. In some cases, the emitted GPIO signal triggers the transition between a display mode and a camera mode. In some examples, image sensor 405 may generate the GPIO signal in conjunction with one or more processors or logical integrated circuits (e.g., image processor 220, sensor configuration manager 225, a CPU of an associated device, etc.).

In some examples, the emitted GPIO signal may control the transition between display mode and camera mode based on a voltage level of GPIO signal. When image sensor 405 powers on and starts streaming captured pixels (e.g., including start of framer markers), a voltage level of the GPIO may be set to camera mode voltage level (e.g., a high voltage level or a low voltage level, etc.). When image sensor 405 powers off and stops streaming captured pixels, a voltage level of the GPIO may be set to a display mode voltage level (e.g., a low voltage level or a high voltage level, or a voltage level opposite the camera mode voltage level, etc.). In some cases, a voltage level of zero or relatively near zero may indicate a low voltage level, while a voltage level above a given voltage threshold (e.g., a voltage level at or relatively near 4.3 volts or 5 volts, etc.) may indicate a high voltage level.

In some examples, when the voltage level of the GPIO between a cathode and an anode associated with display 420 is above a voltage threshold a transition between camera mode and display mode may be triggered (e.g., from camera mode to display mode, or from display mode to camera mode). In some cases, when the voltage level of the GPIO between the cathode and anode associated with display 420 is below a voltage threshold a transition between camera mode and display mode may be triggered (e.g., from display mode to camera mode, or from camera mode to display mode).

In some examples, display 420 may receive or process the GPIO signal via display control 415. In some cases, when a processor associated with image sensor 405 may detect a start of frame marker (e.g., a start of frame marker from a camera serial interface decoder of image sensor 405). The processor associated with image sensor 405 may include an image processor (e.g., image processor 220), or a CPU of the device, or a mobile station modem of the device, or a logical integrated circuit integrated in image sensor 405, or any combination thereof.

As shown, image sensor 405 (e.g., in conjunction with a processor associated with image sensor 405) may generate a GPIO signal and transmit the generated GPIO signal to display control 415 over GPIO connection 410. In some cases, GPIO connection 410 may be dedicated to triggering transitions between display mode and camera mode.

In some examples, display control 415 may include a multiplexer. In some cases, display control 415 may set an output voltage (Vout) to a first voltage (V1) when display control 415 receives GPIO at or near the high voltage level, and may set Vout to a second voltage (V2) when display control 415 receives GPIO at or near the low voltage level. In the illustrated example, V1 is a voltage level above some voltage threshold (V1>Vth), while V2 is a voltage level below the voltage threshold (V2<Vth).

In the illustrated example, GPIO at a high voltage level may trigger a transition from display mode to camera mode. Accordingly, when image sensor 405 emits a GPIO signal at the high voltage level, display control 415 may determine the received GPIO signal is at the high voltage level. When display control 415 determines that the received GPIO signal is at the high voltage level, display control 415 may set Vout to V1 and output Vout to display 420.

The present techniques reduce call transition times and free up processing cycles of one or more devices (e.g., battery-operated devices, device 205 of FIG. 2, etc.) by emitting a GPIO signal over GPIO connection 410 to trigger the display 420 to transition between a display mode and a camera mode, thus improving user experience of the one or more devices with improved display/camera transition times, longer battery life, and improved quality of service. The present techniques result in faster camera convergence times and faster preview output times. Accordingly, the described techniques result in decreasing system latency and improving user experience.

Figure 5:
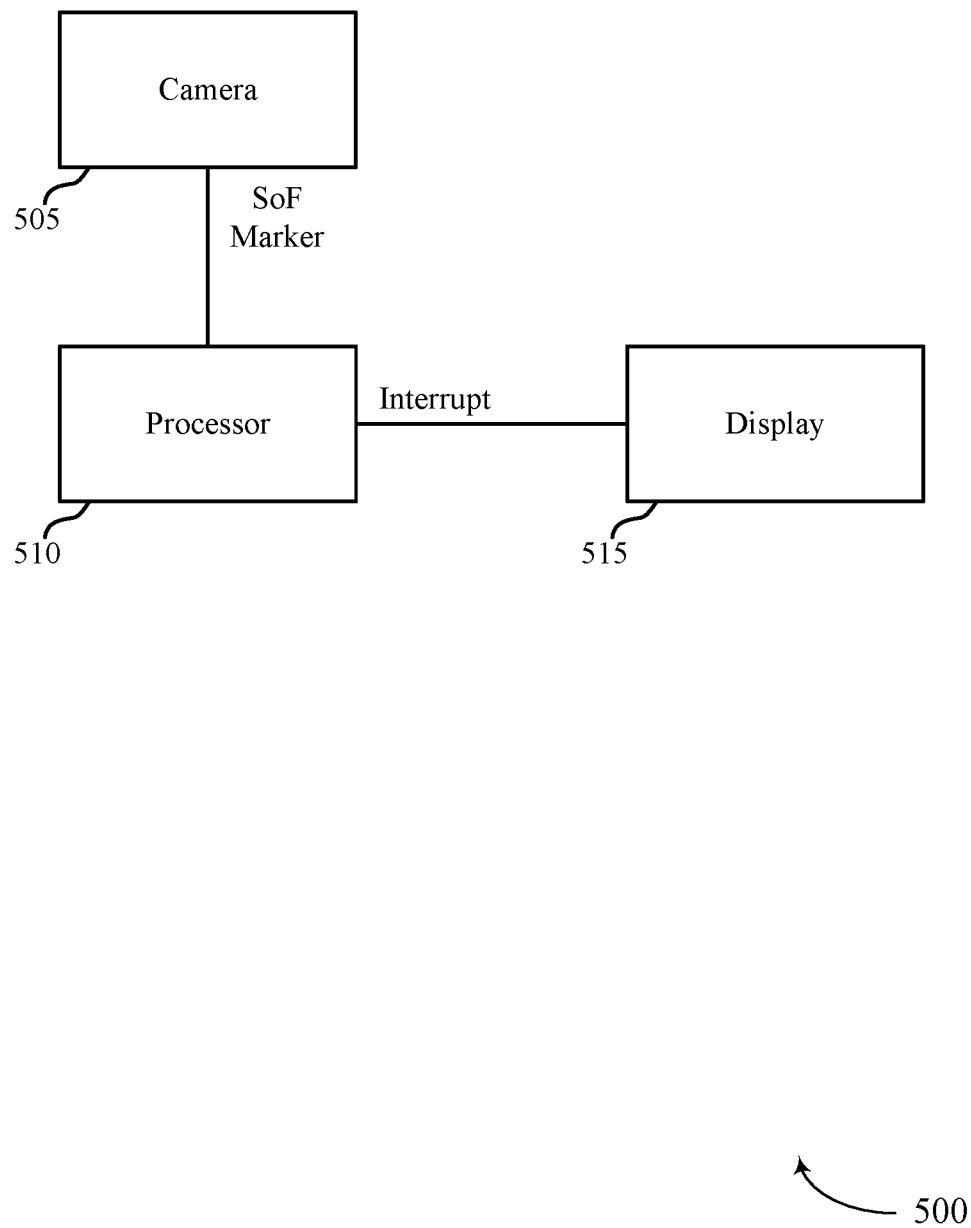
FIG. 5 illustrates an example of a block diagram that supports in-display camera activation in accordance with aspects of the present disclosure.

FIG. 5 illustrates an example of a block diagram 500 that supports in-display camera activation in accordance with aspects of the present disclosure. In some examples, block diagram 500 may implement aspects of multimedia system 100. In the illustrated example, block diagram 500 includes image sensor 505, display control 515, and display 520. In some cases, image sensor 505 may be an example of image sensor 315 of FIG. 3 or image sensor 405 of FIG. 4. In some cases, display 520 may be an example of display 330 of FIG. 3 or display 420 of FIG. 4. In some cases, display control 515 may include a display processor, or a display driver, or a logical integrated circuit of display 520, or any combination thereof. In some cases, display 520 may include at least a portion of display control 515.

In some examples, block diagram 500 illustrates an example of a GPIO synchronization mechanism to transition the display pixels when the camera powers on (e.g., transition the subset of liquid crystal elements of the transition aperture). As shown, a GPIO connection 510 may connect between image sensor 505 and display control 515. In some cases, image sensor 505 may generate the GPIO signal and emit the GPIO signal to display control 515 over GPIO connection 510. In some cases, the emitted GPIO signal triggers the transition between a display mode and a camera mode. In some examples, image sensor 505 may generate the GPIO signal in conjunction with one or more processors or logical integrated circuits (e.g., image processor 220, sensor configuration manager 225, a CPU of an associated device, etc.).

In some examples, the emitted GPIO signal may control the transition between display mode and camera mode based on a voltage level of GPIO signal. When image sensor 505 powers on and starts streaming captured pixels (e.g., including start of framer markers), a voltage level of the GPIO may be set to camera mode voltage level (e.g., a high voltage level or a low voltage level, etc.). When image sensor 505 powers off and stops streaming captured pixels, a voltage level of the GPIO may be set to a display mode voltage level (e.g., a low voltage level or a high voltage level, or a voltage level opposite the camera mode voltage level, etc.). In some cases, a voltage level of zero or relatively near zero may indicate a low voltage level, while a voltage level above a given voltage threshold (e.g., a voltage level at or relatively near 5.3 volts or 5 volts, etc.) may indicate a high voltage level.

In some examples, when the voltage level of the GPIO between a cathode and an anode associated with display 520 is above a voltage threshold a transition between camera mode and display mode may be triggered (e.g., from camera mode to display mode, or from display mode to camera mode). In some cases, when the voltage level of the GPIO between the cathode and anode associated with display 520 is below a voltage threshold a transition between camera mode and display mode may be triggered (e.g., from display mode to camera mode, or from camera mode to display mode).

In some examples, display 520 may receive or process the GPIO signal via display control 515. In some cases, when a processor associated with image sensor 505 may detect a start of frame marker (e.g., a start of frame marker from a camera serial interface decoder of image sensor 505). The processor associated with image sensor 505 may include an image processor (e.g., image processor 220), or a CPU of the device, or a mobile station modem of the device, or a logical integrated circuit integrated in image sensor 505, or any combination thereof.

As shown, image sensor 505 (e.g., in conjunction with a processor associated with image sensor 505) may generate a GPIO signal and transmit the generated GPIO signal to display control 515 over GPIO connection 510. In some cases, GPIO connection 510 may be dedicated to triggering transitions between display mode and camera mode.

In some examples, display control 515 may include a multiplexer. In some cases, display control 515 may set an output voltage (Vout) to a first voltage (V1) when display control 515 receives GPIO at or near the high voltage level, and may set Vout to a second voltage (V2) when display control 515 receives GPIO at or near the low voltage level. In the illustrated example, V1 is a voltage level above some voltage threshold (V1>Vth), while V2 is a voltage level below the voltage threshold (V2<Vth).

In the illustrated example, GPIO at a high voltage level may trigger a transition from display mode to camera mode. Accordingly, when image sensor 505 emits a GPIO signal at the high voltage level, display control 515 may determine the received GPIO signal is at the high voltage level. When display control 515 determines that the received GPIO signal is at the high voltage level, display control 515 may set Vout to V1 and output Vout to display 520.

The present techniques reduce call transition times and free up processing cycles of one or more devices (e.g., battery-operated devices, device 105 of FIG. 1, device 205 of FIG. 2, etc.) by emitting a GPIO signal over GPIO connection 510 to trigger the display 520 to transition between a display mode and a camera mode, thus improving user experience of the one or more devices with improved display/camera transition times, longer battery life, and improved quality of service. The present techniques result in faster camera convergence times and faster preview output times. Accordingly, the described techniques result in decreasing system latency and improving user experience.

Figure 6:
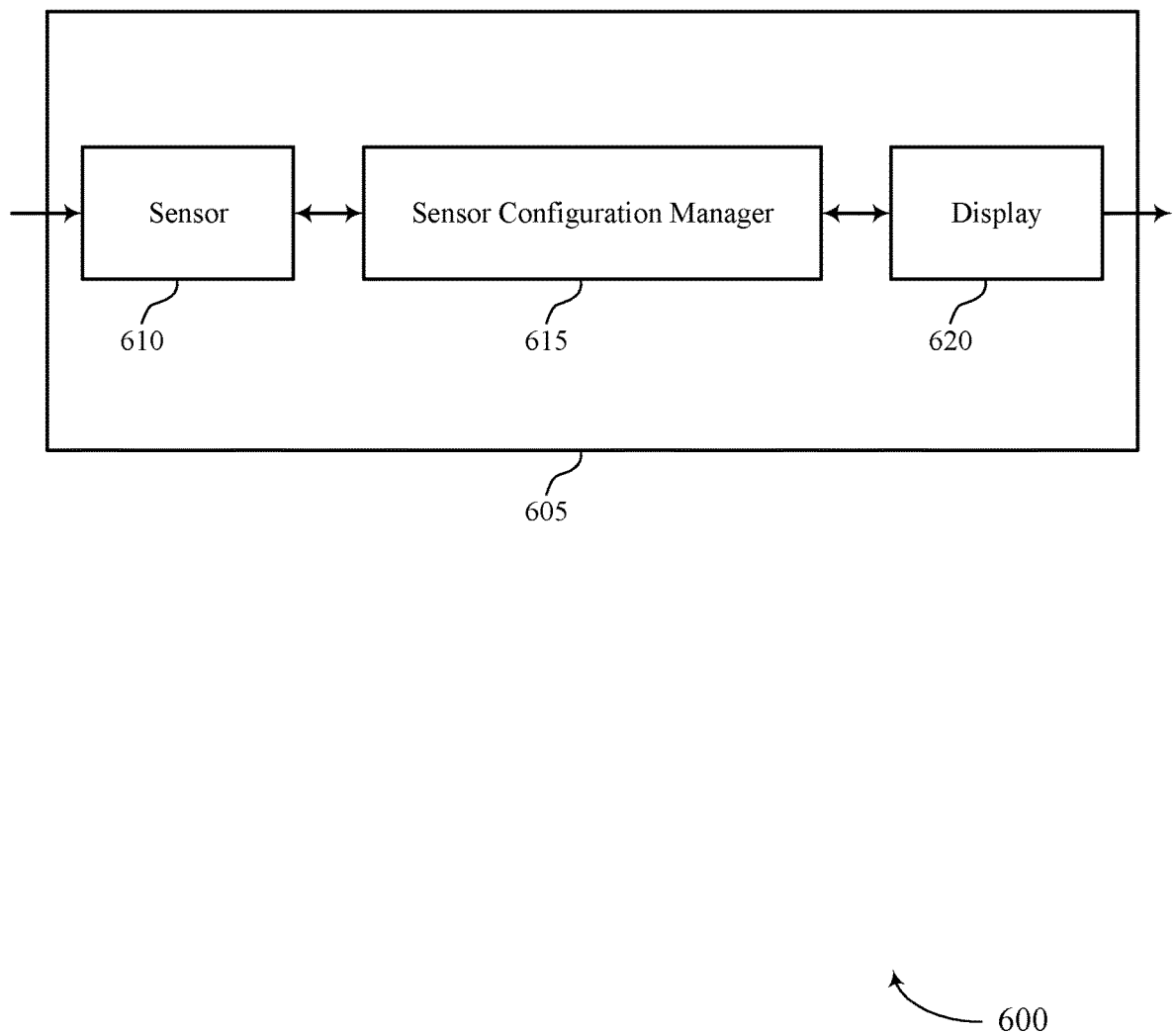
FIGS. 6 and 7 show block diagrams of devices that support in-display camera activation in accordance with aspects of the present disclosure.

FIG. 6 shows a block diagram 600 of a device 605 that supports in-display camera activation in accordance with aspects of the present disclosure. The device 605 may be an example of aspects of a camera device as described herein. The device 605 may include a sensor 610, a sensor configuration manager 615, and a display 620. The device 605 may also include a processor. Each of these components may be in communication with one another (e.g., via one or more buses).

The one or more sensors 610 (e.g., image sensors, cameras, etc.) may receive information (e.g., light, for example, visible light and/or invisible light), which may be passed on to other components of the device 605. In some cases, the sensors 610 may be an example of aspects of the I/O controller 915 described with reference to FIG. 9. A sensor 610 may utilize one or more photosensitive elements that have a sensitivity to a spectrum of electromagnetic radiation to receive information (e.g., a sensor 610 may be configured or tuned to receive a pixel intensity value, red green blue (RGB) values, infrared (IR) light values, near-IR light values, ultraviolet (UV) light values of a pixel, etc.). The information may then be passed on to other components of the device 605.

The sensor configuration manager 615 may receive a request to activate a camera of the device, identify a start of frame marker associated with activating the camera in response to the request, and emit a signal to a display of the device in response to the identified start of frame marker, where the emitted signal triggers the display to transition a set of liquid crystal elements of the display from a display mode to a camera mode for camera operation. The sensor configuration manager 615 may be an example of aspects of the sensor configuration manager 910 described herein.

The sensor configuration manager 615, or its sub-components, may be implemented in hardware, code (e.g., software or firmware) executed by a processor, or any combination thereof. If implemented in code executed by a processor, the functions of the sensor configuration manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The sensor configuration manager 615, or its sub-components, may be physically located at various positions, including being distributed such that portions of functions are implemented at different physical locations by one or more physical components. In some examples, the sensor configuration manager 615, or its sub-components, may be a separate and distinct component in accordance with various aspects of the present disclosure. In some examples, the sensor configuration manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Display 620 may display content generated by other components of the device. Display 620 may be an example of display 20 as described with reference to FIG. 6. In some examples, display 620 may be connected with a display buffer which stores rendered data until an image is ready to be displayed (e.g., as described with reference to FIG. 6). The display 620 may illuminate according to signals or information generated by other components of the device 605. For example, the display 620 may receive display information (e.g., pixel mappings, display adjustments) from sensor 610, and may illuminate accordingly. The display 620 may represent a unit capable of displaying video, images, text or any other type of data for consumption by a viewer. Display 620 may include a liquid-crystal display (LCD), a light emitting diode (LED) display, an organic LED (OLED), an active-matrix OLED (AMOLED), or the like. In some cases, display 620 and an I/O controller (e.g., I/O controller 915) may be or represent aspects of a same component (e.g., a touchscreen) of device 605. The display 620 may be any suitable display or screen allowing for user interaction and/or allowing for presentation of information (such as captured images and video) for viewing by a user. In some aspects, the display 620 may be a touch-sensitive display. In some cases, the display 620 may display images captured by sensors, where the displayed images that are captured by sensors may depend on the configuration of light sources and active sensors by the sensor configuration manager 615.

Figure 7:
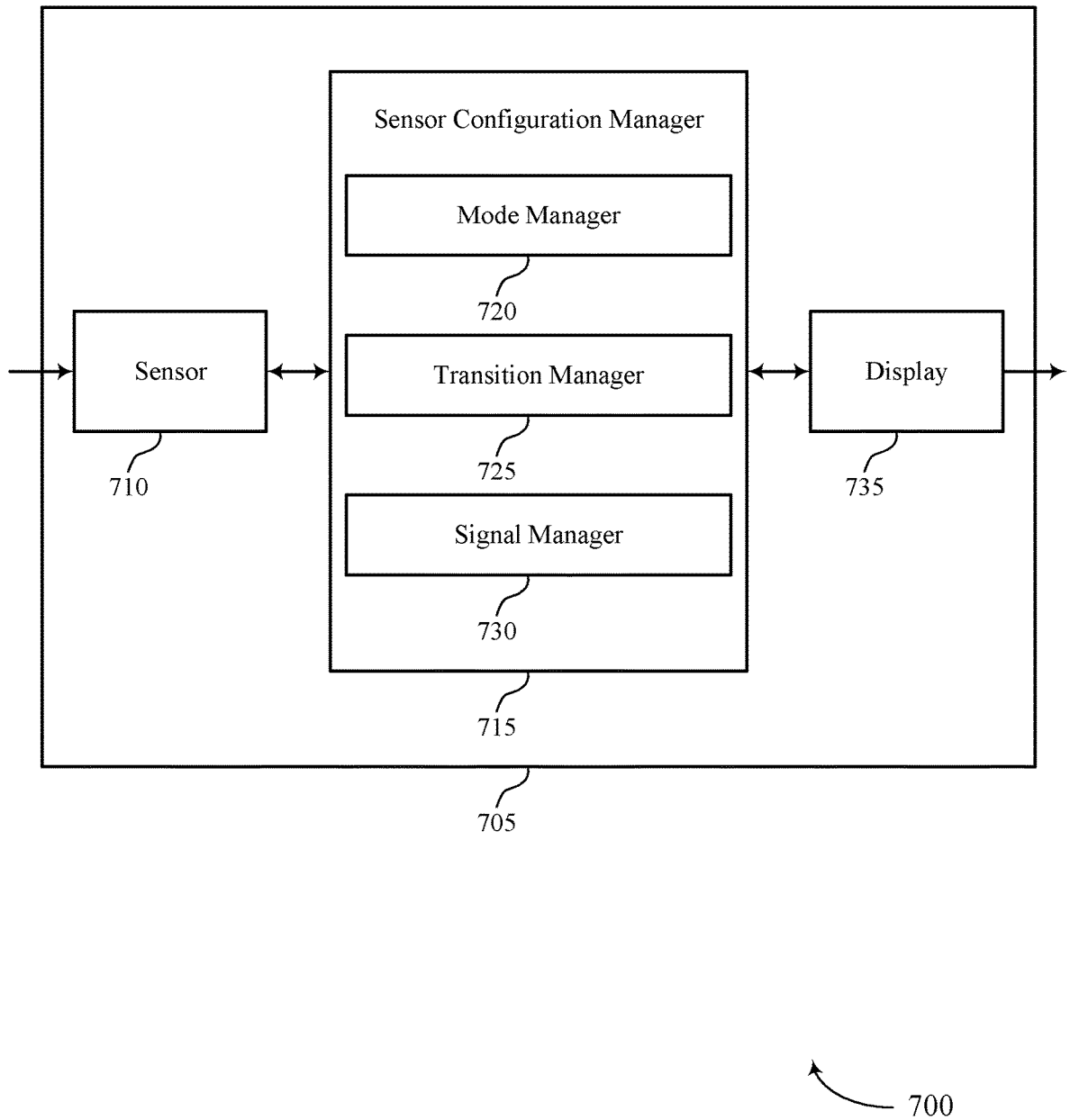

FIG. 7 shows a block diagram 700 of a device 705 that supports in-display camera activation in accordance with aspects of the present disclosure. The device 705 may be an example of aspects of a device 605 or a device 105 as described herein. The device 705 may include a sensor 710, a sensor configuration manager 715, and a display 735. The device 705 may also include a processor. Each of these components may be in communication with one another (e.g., via one or more buses).

The one or more sensors 710 (e.g., image sensors, cameras, etc.) may receive information (e.g., light, for example, visible light and/or invisible light), which may be passed on to other components of the device 705. In some cases, the sensors 710 may be an example of aspects of the I/O controller 915 described with reference to FIG. 9. A sensor 710 may utilize one or more photosensitive elements that have a sensitivity to a spectrum of electromagnetic radiation to receive information (e.g., a sensor 710 may be configured or tuned to receive a pixel intensity value, red green blue (RGB) values, infrared (IR) light values, near-IR light values, ultraviolet (UV) light values of a pixel, etc.). The information may then be passed on to other components of the device 705.

The sensor configuration manager 715 may be an example of aspects of the sensor configuration manager 615 as described herein. The sensor configuration manager 715 may include a mode manager 720, a transition manager 725, and a signal manager 730. The sensor configuration manager 715 may be an example of aspects of the sensor configuration manager 910 described herein. The mode manager 720 may receive a request to activate a camera of the device. The transition manager 725 may identify a start of frame marker associated with activating the camera in response to the request.

The signal manager 730 may emit a signal to a display of the device in response to the identified start of frame marker, where the emitted signal triggers the display to transition a set of liquid crystal elements of the display from a display mode to a camera mode for camera operation.

Display 735 may display content generated by other components of the device. Display 735 may be an example of display 735 as described with reference to FIG. 7. In some examples, display 735 may be connected with a display buffer which stores rendered data until an image is ready to be displayed (e.g., as described with reference to FIG. 7). The display 735 may illuminate according to signals or information generated by other components of the device 705. For example, the display 735 may receive display information (e.g., pixel mappings, display adjustments) from sensor 710, and may illuminate accordingly. The display 735 may represent a unit capable of displaying video, images, text or any other type of data for consumption by a viewer. Display 735 may include a liquid-crystal display (LCD), a light emitting diode (LED) display, an organic LED (OLED), an active-matrix OLED (AMOLED), or the like. In some cases, display 735 and an I/O controller (e.g., I/O controller 915) may be or represent aspects of a same component (e.g., a touchscreen) of device 705. The display 735 may be any suitable display or screen allowing for user interaction and/or allowing for presentation of information (such as captured images and video) for viewing by a user. In some aspects, the display 735 may be a touch-sensitive display. In some cases, the display 735 may display images captured by sensors, where the displayed images that are captured by sensors may depend on the configuration of light sources and active sensors by the sensor configuration manager 715.

Figure 8:
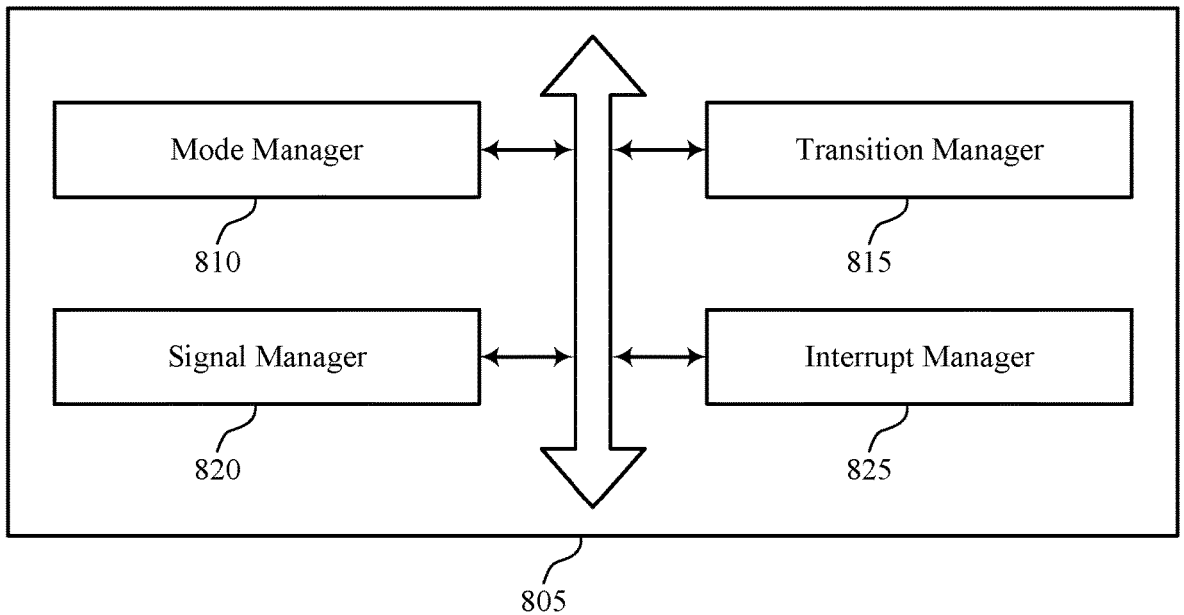
FIG. 8 shows a block diagram of a sensor configuration manager that supports in-display camera activation in accordance with aspects of the present disclosure.

FIG. 8 shows a block diagram 800 of a sensor configuration manager 805 that supports in-display camera activation in accordance with aspects of the present disclosure. The sensor configuration manager 805 may be an example of aspects of a sensor configuration manager 615, a sensor configuration manager 715, or a sensor configuration manager 910 described herein. The sensor configuration manager 805 may include a mode manager 810, a transition manager 815, a signal manager 820, and an interrupt manager 825. Each of these modules may communicate, directly or indirectly, with one another (e.g., via one or more buses).

The mode manager 810 may receive a request to activate a camera of the device. The transition manager 815 may identify a start of frame marker associated with activating the camera in response to the request. The signal manager 820 may emit a signal to a display of the device in response to the identified start of frame marker, where the emitted signal triggers the display to transition a set of liquid crystal elements of the display from a display mode to a camera mode for camera operation. In some cases, the camera is positioned behind the set of liquid crystal elements, and where a field of view of the camera is aligned with the set of liquid crystal elements.

In some examples, the signal manager 820 may determine, based on receiving the request to activate the camera of the device, a first direct current voltage level. In some examples, the signal manager 820 may emit, by a camera sensor of the device, the GPIO signal at the first direct current voltage level to trigger the transition of the set of liquid crystal elements. In some examples, the signal manager 820 may align the set of liquid crystal elements in a first orientation that increases transmission of light through the set of liquid crystal elements to the camera sensor when the GPIO signal is emitted at the first direct current voltage level.

In some cases, an electrical connection of the GPIO signal connects between the camera sensor and a controller or a switch of the display of the device. In some cases, the controller or the switch of the display emits a trigger voltage when the controller or the switch detects the GPIO signal at the first direct current voltage level, where the trigger voltage triggers the transition of the set of liquid crystal elements. In some cases, the set of liquid crystal elements align in a second orientation that decreases transmission of light through the set of liquid crystal elements to the camera sensor when the GPIO signal is emitted at a second level different from the first direct current voltage level.

The interrupt manager 825 may generate, by a processor of the device, an interrupt in response to the processor identifying the start of frame marker. In some examples, the interrupt manager 825 may register the generated interrupt with a camera driver of the camera during initialization of the camera driver, where the camera driver is initialized after receiving the request to activate the camera and before the camera is activated.

In some examples, the interrupt manager 825 may send the registered interrupt from the camera driver to a display driver of the display. In some cases, the display driver receiving the registered interrupt triggers the transition of the set of liquid crystal elements.

Figure 9:
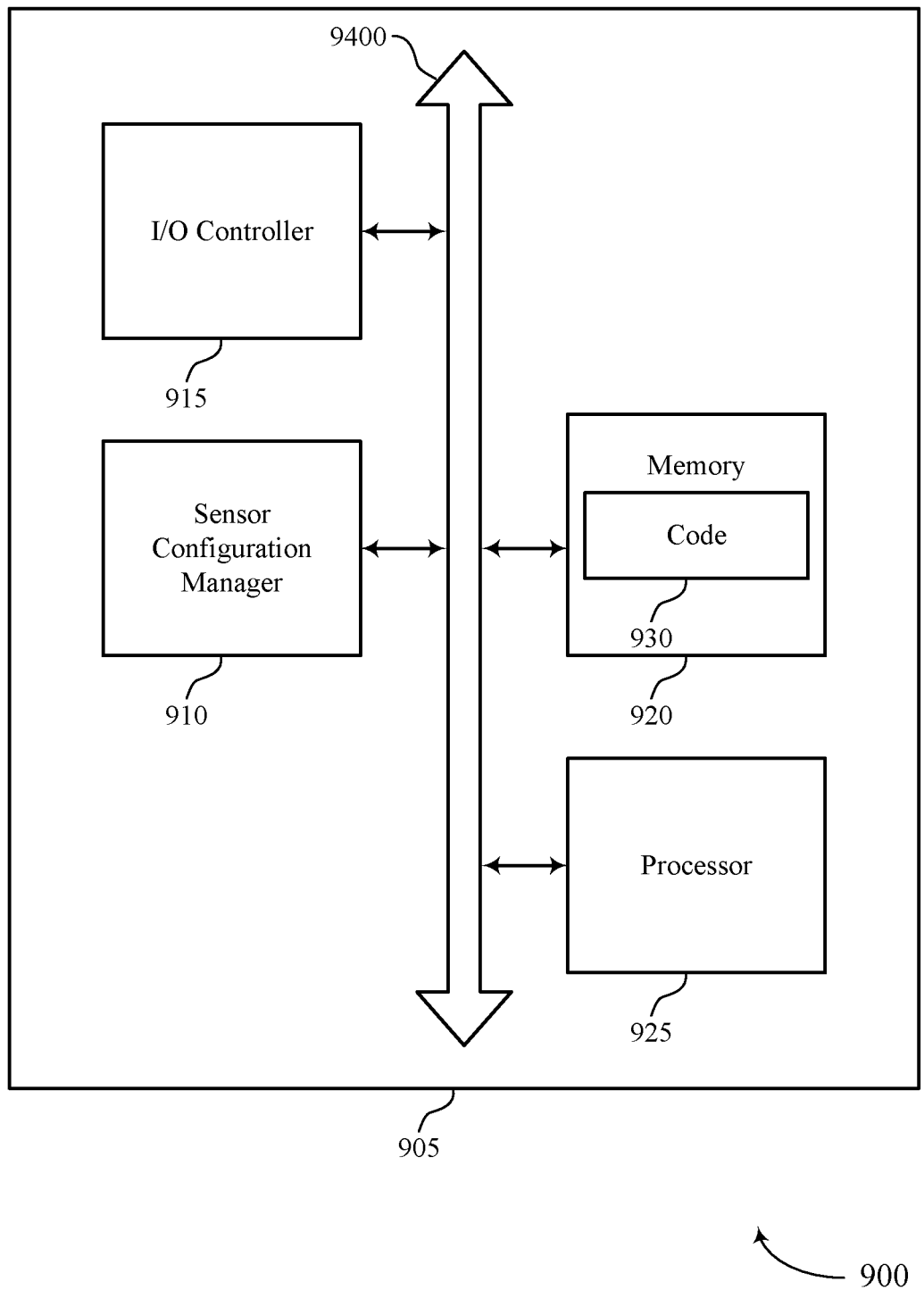
FIG. 9 shows a diagram of a system including a device that supports in-display camera activation in accordance with aspects of the present disclosure.

FIG. 9 shows a diagram of a system 900 including a device 905 that supports in-display camera activation in accordance with aspects of the present disclosure. The device 905 may be an example of or include the components of device 605, device 705, or a camera device as described herein. The device 905 may include components for bi-directional voice and data communications including components for transmitting and receiving communications, including a sensor configuration manager 910, an I/O controller 915, memory 920, a processor 925, and a light source 935. These components may be in electronic communication via one or more buses (e.g., bus).

The sensor configuration manager 910 may receive a request to activate a camera of the device, identify a start of frame marker associated with activating the camera in response to the request, and emit a signal to a display of the device in response to the identified start of frame marker, where the emitted signal triggers the display to transition a set of liquid crystal elements of the display from a display mode to a camera mode for camera operation.

I/O controller 915 may manage input and output signals for device 905. I/O controller 915 may also manage peripherals not integrated into device 905. In some cases, I/O controller 915 may represent a physical connection or port to an external peripheral. In some cases, I/O controller 915 may utilize an operating system such as iOS®, ANDROID®, MS-DOS®, MS-WINDOWS®, OS/2®, UNIX®, LINUX®, or another known operating system. In other cases, I/O controller 915 may represent or interact with a modem, a keyboard, a mouse, a touchscreen, or a similar device. In some cases, I/O controller 915 may be implemented as part of a processor. In some cases, a user may interact with device 905 via I/O controller 915 or via hardware components controlled by I/O controller 915.

The memory 920 may include RAM and ROM. The memory 920 may store computer-readable, computer-executable code 930 including instructions that, when executed, cause the processor to perform various functions described herein. In some cases, the memory 920 may contain, among other things, a BIOS which may control basic hardware or software operation such as the interaction with peripheral components or devices.

The processor 925 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 925 may be configured to operate a memory array using a memory controller. In other cases, a memory controller may be integrated into the processor 925. The processor 925 may be configured to execute computer-readable instructions stored in a memory (e.g., the memory 920) to cause the device 905 to perform various functions (e.g., functions or tasks supporting in-display camera activation).

The software 930 may include instructions to implement aspects of the present disclosure, including instructions to support in-display camera activation. The software 930 may be stored in a non-transitory computer-readable medium such as system memory or other type of memory. In some cases, the software 930 may not be directly executable by the processor 925 but may cause a computer (e.g., when compiled and executed) to perform functions described herein.

The one or more light sources 935 may include light sources capable of emitting visible light and/or invisible light. In an example, the light sources 935 may include a visible light source and an active invisible light source (e.g., IR light source, near-IR light source, UV light source). In some cases, the light sources 935 may be an example of aspects of the light source 35 described with reference to FIG. 9.

Figure 10:
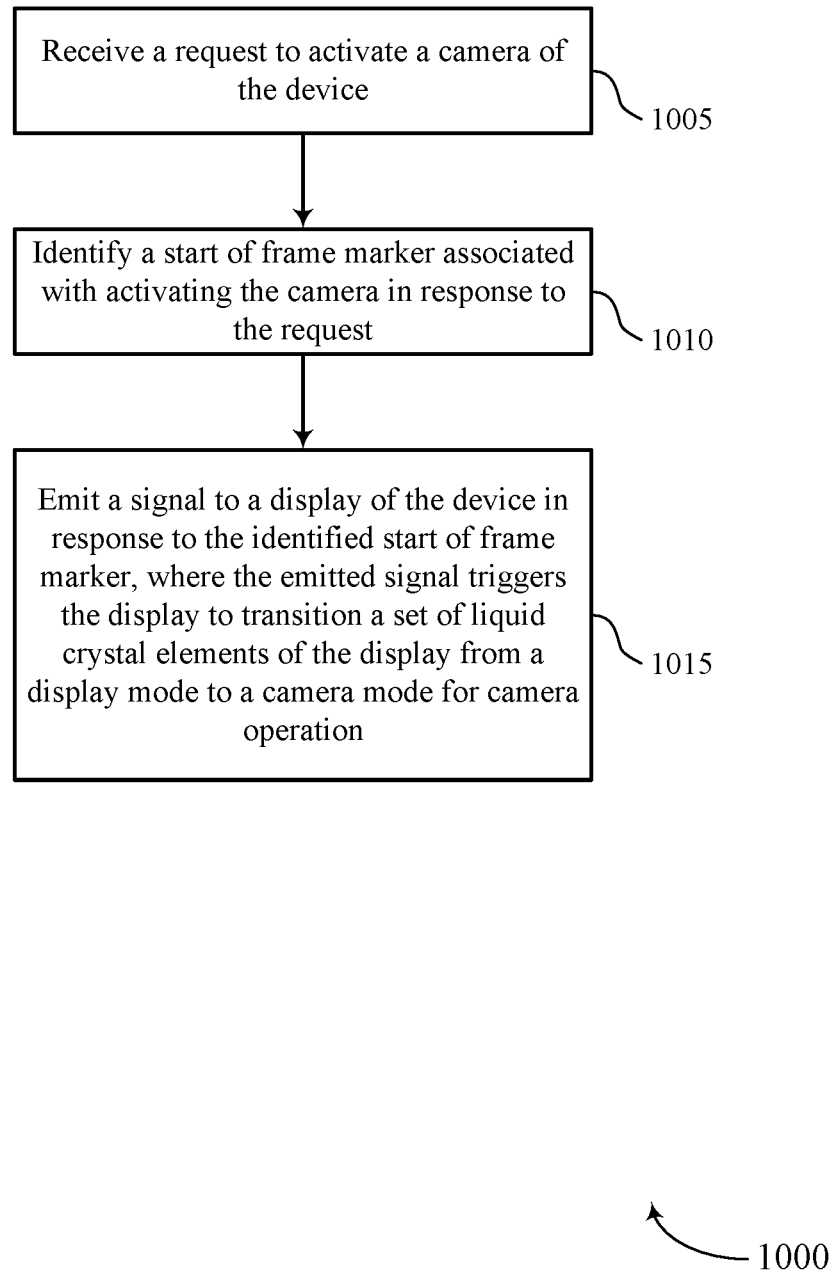
FIGS. 10 through 12 show flowcharts illustrating methods that support in-display camera activation in accordance with aspects of the present disclosure.

FIG. 10 shows a flowchart illustrating a method 1000 that supports in-display camera activation in accordance with aspects of the present disclosure. The operations of method 1000 may be implemented by a camera device (e.g., device 105 of FIG. 1) or its components as described herein. For example, the operations of method 1000 may be performed by a sensor configuration manager as described with reference to FIGS. 6 through 9. In some examples, a camera device may execute a set of instructions to control the functional elements of the camera device to perform the functions described below. Additionally, or alternatively, a camera device may perform aspects of the functions described below using special-purpose hardware.

At 1005, the camera device may receive a request to activate a camera of the device. The operations of 1005 may be performed according to the methods described herein. In some examples, aspects of the operations of 1005 may be performed by a mode manager as described with reference to FIGS. 6 through 9.

At 1010, the camera device may identify a start of frame marker associated with activating the camera in response to the request. The operations of 1010 may be performed according to the methods described herein. In some examples, aspects of the operations of 1010 may be performed by a transition manager as described with reference to FIGS. 6 through 9.

At 1015, the camera device may emit a signal to a display of the device in response to the identified start of frame marker, where the emitted signal triggers the display to transition a set of liquid crystal elements of the display from a display mode to a camera mode for camera operation. The operations of 1015 may be performed according to the methods described herein. In some examples, aspects of the operations of 1015 may be performed by a signal manager as described with reference to FIGS. 6 through 9.

Figure 11:
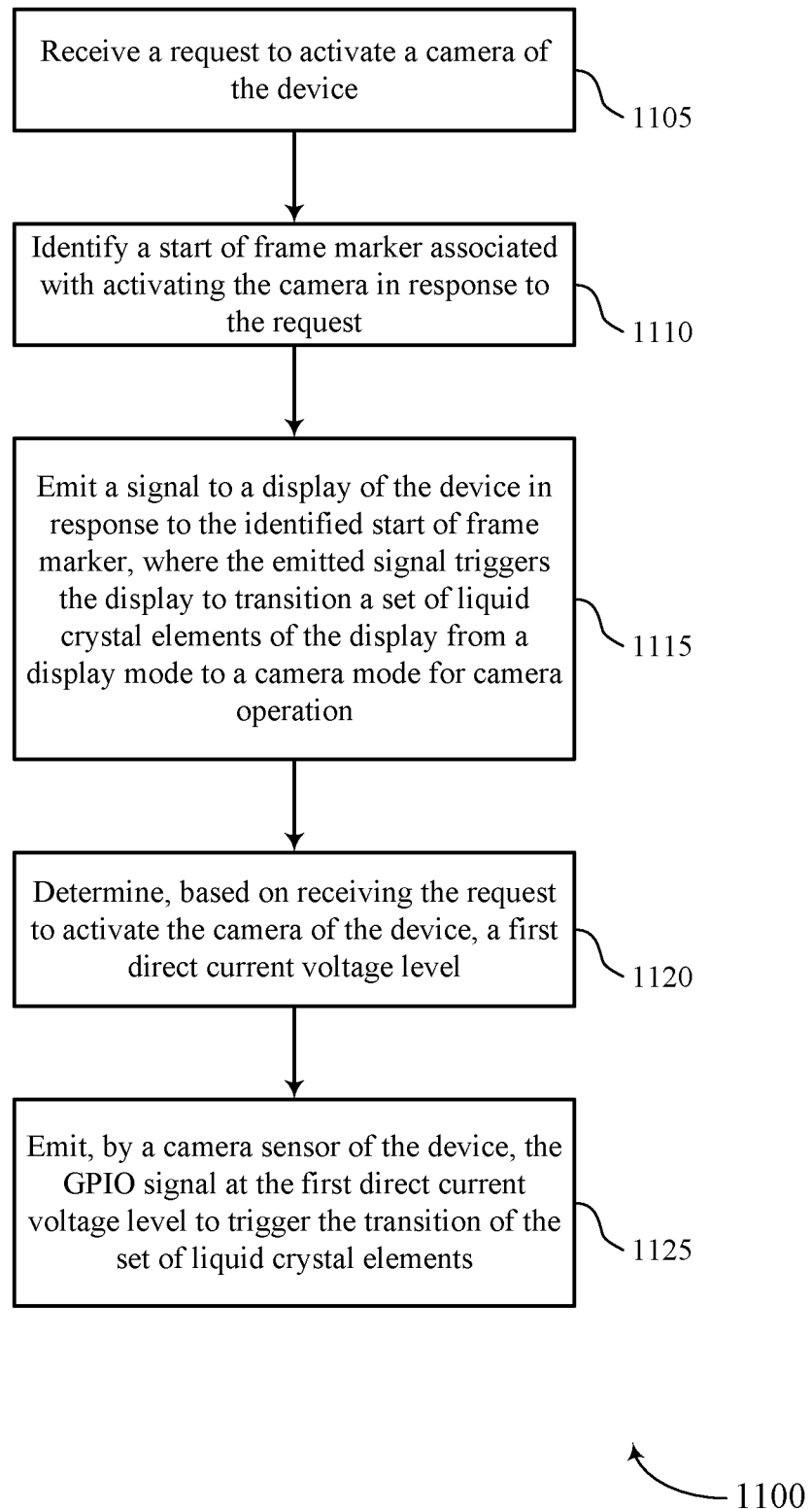

FIG. 11 shows a flowchart illustrating a method 1100 that supports in-display camera activation in accordance with aspects of the present disclosure. The operations of method 1100 may be implemented by a camera device or its components as described herein. For example, the operations of method 1100 may be performed by a sensor configuration manager as described with reference to FIGS. 6 through 9. In some examples, a camera device may execute a set of instructions to control the functional elements of the camera device to perform the functions described below. Additionally, or alternatively, a camera device may perform aspects of the functions described below using special-purpose hardware.

At 1105, the camera device may receive a request to activate a camera of the device. The operations of 1105 may be performed according to the methods described herein. In some examples, aspects of the operations of 1105 may be performed by a mode manager as described with reference to FIGS. 6 through 9.

At 1110, the camera device may identify a start of frame marker associated with activating the camera in response to the request. The operations of 1110 may be performed according to the methods described herein. In some examples, aspects of the operations of 1110 may be performed by a transition manager as described with reference to FIGS. 6 through 9.

At 1115, the camera device may emit a signal to a display of the device in response to the identified start of frame marker, where the emitted signal triggers the display to transition a set of liquid crystal elements of the display from a display mode to a camera mode for camera operation. The operations of 1115 may be performed according to the methods described herein. In some examples, aspects of the operations of 1115 may be performed by a signal manager as described with reference to FIGS. 6 through 9.

At 1120, the camera device may determine, based on receiving the request to activate the camera of the device, a first direct current voltage level. The operations of 1120 may be performed according to the methods described herein. In some examples, aspects of the operations of 1120 may be performed by a signal manager as described with reference to FIGS. 6 through 9.

At 1125, the camera device may emit, by a camera sensor of the device, the GPIO signal at the first direct current voltage level to trigger the transition of the set of liquid crystal elements. The operations of 1125 may be performed according to the methods described herein. In some examples, aspects of the operations of 1125 may be performed by a signal manager as described with reference to FIGS. 6 through 9.

Figure 12:
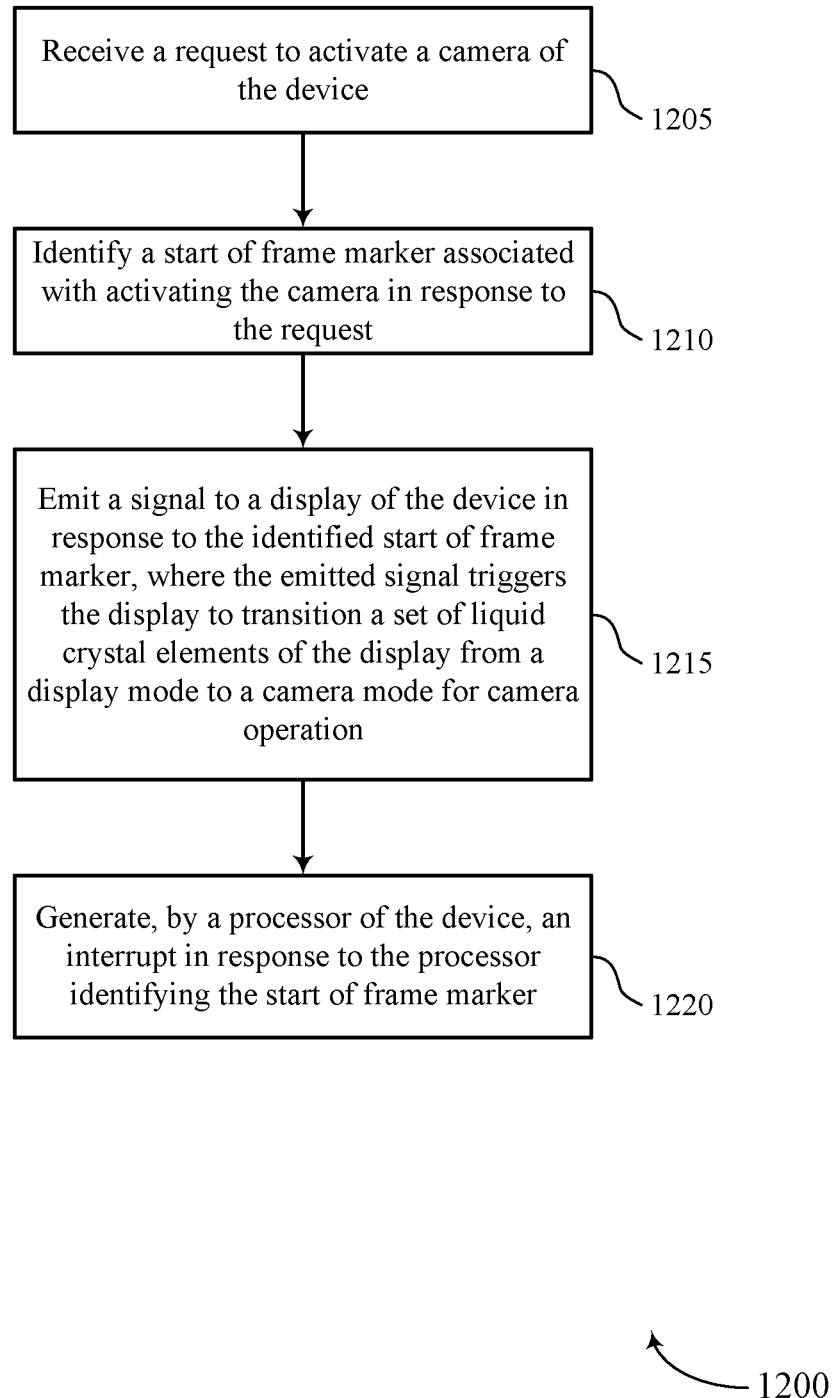

FIG. 12 shows a flowchart illustrating a method 1200 that supports in-display camera activation in accordance with aspects of the present disclosure. The operations of method 1200 may be implemented by a camera device or its components as described herein. For example, the operations of method 1200 may be performed by a sensor configuration manager as described with reference to FIGS. 6 through 9. In some examples, a camera device may execute a set of instructions to control the functional elements of the camera device to perform the functions described below. Additionally, or alternatively, a camera device may perform aspects of the functions described below using special-purpose hardware.

At 1205, the camera device may receive a request to activate a camera of the device. The operations of 1205 may be performed according to the methods described herein. In some examples, aspects of the operations of 1205 may be performed by a mode manager as described with reference to FIGS. 6 through 9.

At 1210, the camera device may identify a start of frame marker associated with activating the camera in response to the request. The operations of 1210 may be performed according to the methods described herein. In some examples, aspects of the operations of 1210 may be performed by a transition manager as described with reference to FIGS. 6 through 9.

At 1215, the camera device may emit a signal to a display of the device in response to the identified start of frame marker, where the emitted signal triggers the display to transition a set of liquid crystal elements of the display from a display mode to a camera mode for camera operation. The operations of 1215 may be performed according to the methods described herein. In some examples, aspects of the operations of 1215 may be performed by a signal manager as described with reference to FIGS. 6 through 9.

At 1220, the camera device may generate, by a processor of the device, an interrupt in response to the processor identifying the start of frame marker. The operations of 1220 may be performed according to the methods described herein. In some examples, aspects of the operations of 1220 may be performed by an interrupt manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for in-display camera activation by a device, comprising: receiving a request to activate a camera of the device; identifying a start of frame marker associated with activating the camera in response to the request; and emitting a signal to a display of the device in response to the identified start of frame marker, wherein the emitted signal triggers the display to transition a set of liquid crystal elements of the display from a display mode to a camera mode for camera operation.

Aspect 2: The method of aspect 1, wherein the signal comprises a general purpose input output (GPIO) signal and emitting the signal comprises: determining, based at least in part on receiving the request to activate the camera of the device, a first direct current voltage level; and emitting, by a camera sensor of the device, the GPIO signal at the first direct current voltage level to trigger the transition of the set of liquid crystal elements.

Aspect 3: The method of aspect 2, wherein an electrical connection of the GPIO signal connects between the camera sensor and a controller or a switch of the display of the device.

Aspect 4: The method of aspect 3, wherein the controller or the switch of the display emits a trigger voltage when the controller or the switch detects the GPIO signal at the first direct current voltage level, the trigger voltage triggers the transition of the set of liquid crystal elements.

Aspect 5: The method of any of aspects 2 through 4, wherein transitioning the set of liquid crystal elements comprises: aligning the set of liquid crystal elements in a first orientation that increases transmission of light through the set of liquid crystal elements to the camera sensor when the GPIO signal is emitted at the first direct current voltage level.

Aspect 6: The method of aspect 5, wherein the set of liquid crystal elements align in a second orientation that decreases transmission of light through the set of liquid crystal elements to the camera sensor when the GPIO signal is emitted at a second level different from the first direct current voltage level.

Aspect 7: The method of any of aspects 1 through 6, wherein emitting the signal comprises: generating, by a processor of the device, an interrupt in response to the processor identifying the start of frame marker.

Aspect 8: The method of aspect 7, comprising: registering the generated interrupt with a camera driver of the camera during initialization of the camera driver, wherein the camera driver is initialized after receiving the request to activate the camera and before the camera is activated.

Aspect 9: The method of aspect 8, wherein emitting the signal to the display of the device comprises: sending the registered interrupt from the camera driver to a display driver of the display.

Aspect 10: The method of aspect 9, wherein the display driver receiving the registered interrupt triggers the transition of the set of liquid crystal elements.

Aspect 11: The method of any of aspects 1 through 10, wherein the camera is positioned behind the set of liquid crystal elements, and a field of view of the camera is aligned with the set of liquid crystal elements.

Aspect 12: A camera of a device for in-display camera activation, comprising: a processor, memory coupled with the processor; and instructions stored in the memory and executable by the processor to cause the camera to: receive a request to activate the camera; identify a start of frame marker associated with activating the camera in response to the request; and emit a signal to a display of the device in response to the identified start of frame marker, wherein the emitted signal triggers the display to transition a set of liquid crystal elements of the display from a display mode to a camera mode for camera operation.

Aspect 13: The camera of aspect 12, wherein the signal comprises a general purpose input output (GPIO) signal and emitting the signal comprises instructions stored in the memory and executable by the processor to cause the camera to: determine, based at least in part on receiving the request to activate the camera of the device, a first direct current voltage level; and emit, by a camera sensor of the camera, the GPIO signal at the first direct current voltage level to trigger the transition of the set of liquid crystal elements.

Aspect 14: An apparatus for in-display camera activation by a device, comprising a processor; memory coupled with the processor; and instructions stored in the memory and executable by the processor to cause the apparatus to perform a method of any of aspects 1 through 11.

Aspect 15: An apparatus for in-display camera activation by a device, comprising at least one means for performing a method of any of aspects 1 through 11.

Aspect 16: A non-transitory computer-readable medium storing code for in-display camera activation by a device, the code comprising instructions executable by a processor to perform a method of any of aspects 1 through 11.

Aspect 17: An apparatus comprising a processor; memory coupled with the processor; and instructions stored in the memory and executable by the processor to cause the apparatus to perform a method of any of aspects 12 through 13.

Aspect 18: An apparatus comprising at least one means for performing a method of any of aspects 12 through 13.

Aspect 19: A non-transitory computer-readable medium storing code the code comprising instructions executable by a processor to perform a method of any of aspects 12 through 13.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for in-display camera activation by a device, comprising:
    receiving a request to activate a camera of the device;
    identifying a start of frame marker associated with activating the camera in response to the request; and
    emitting a signal to a display of the device in response to the identified start of frame marker, wherein the emitted signal triggers the display to transition a set of elements of the display from a display mode to a camera mode for camera operation.

2. The method of claim 1, wherein the signal comprises a general purpose input output (GPIO) signal and emitting the signal comprises:
    determining, based at least in part on receiving the request to activate the camera of the device, a first direct current voltage level; and
    emitting, by a camera sensor of the device, the GPIO signal at the first direct current voltage level to trigger the transition of the set of elements.

3. The method of claim 2, wherein an electrical connection of the GPIO signal connects between the camera sensor and a controller or a switch of the display of the device.

4. The method of claim 3, wherein the controller or the switch of the display emits a trigger voltage when the controller or the switch detects the GPIO signal at the first direct current voltage level, wherein the trigger voltage triggers the transition of the set of elements.

5. The method of claim 2, wherein transitioning the set of elements comprises:
   aligning the set of elements in a first orientation that increases transmission of light through the set of elements to the camera sensor when the GPIO signal is emitted at the first direct current voltage level.

6. The method of claim 5, wherein the set of elements align in a second orientation that decreases transmission of light through the set of elements to the camera sensor when the GPIO signal is emitted at a second level different from the first direct current voltage level.

7. The method of claim 1, wherein emitting the signal comprises:
   generating, by a processor of the device, an interrupt in response to the processor identifying the start of frame marker.

8. The method of claim 7, comprising:
   registering the generated interrupt with a camera driver of the camera during initialization of the camera driver, wherein the camera driver is initialized after receiving the request to activate the camera and before the camera is activated.

9. The method of claim 8, wherein emitting the signal to the display of the device comprises:
   sending the registered interrupt from the camera driver to a display driver of the display.

10. The method of claim 9, wherein the display driver receiving the registered interrupt triggers the transition of the set of elements.

11. The method of claim 1, wherein the camera is positioned behind the set of elements, and wherein a field of view of the camera is aligned with the set of elements.

12. An apparatus for in-display camera activation, comprising:
   a processor,
   memory coupled with the processor; and
   instructions stored in the memory and executable by the processor to cause the apparatus to:
      receive a request to activate a camera of the apparatus;
      identify a start of frame marker associated with activating the camera in response to the request; and
      emit a signal to a display of the apparatus in response to the identified start of frame marker, wherein the emitted signal triggers the display to transition a set of elements of the display from a display mode to a camera mode for camera operation.

13. The apparatus of claim 12, wherein the signal comprises a general purpose input output (GPIO) signal and emitting the signal comprises instructions stored in the memory and executable by the processor to cause the apparatus to:
   determine, based at least in part on receiving the request to activate the camera of the apparatus, a first direct current voltage level; and
   emit, by a camera sensor of the apparatus, the GPIO signal at the first direct current voltage level to trigger the transition of the set of elements.

14. The apparatus of claim 13, wherein an electrical connection of the GPIO signal connects between the camera sensor and a controller or a switch of the display of the apparatus.

15. The apparatus of claim 14, wherein the controller or the switch of the display emits a trigger voltage when the controller or the switch detects the GPIO signal at the first direct current voltage level, wherein the trigger voltage triggers the transition of the set of elements.

16. The apparatus of claim 13, wherein the instructions to transition the set of elements are executable by the processor to cause the apparatus to:
   align the set of elements in a first orientation that increases transmission of light through the set of elements to the camera sensor when the GPIO signal is emitted at the first direct current voltage level.

17. The apparatus of claim 16, wherein the set of elements align in a second orientation that decreases transmission of light through the set of elements to the camera sensor when the GPIO signal is emitted at a second level different from the first direct current voltage level.

18. The apparatus of claim 12, wherein the instructions to emit the signal are executable by the processor to cause the apparatus to:
   generate an interrupt in response to the processor identifying the start of frame marker.

19. A device for in-display camera activation, comprising:
   a camera;
   a display comprising a set of elements;
   at least one processor;
   memory coupled with the at least one processor; and
   instructions stored in the memory and executable by the at least one processor to cause the camera to:
      receive a request to activate the camera;
      identify a start of frame marker associated with activating the camera in response to the request; and
      emit a signal to the display of the device in response to the identified start of frame marker, wherein the emitted signal triggers the display to transition a set of elements of the display from a display mode to a camera mode for camera operation.

20. The device of claim 19, wherein the signal comprises a general purpose input output (GPIO) signal and emitting the signal comprises instructions stored in the memory and executable by the at least one processor to cause the camera to:
   determine, based at least in part on receiving the request to activate the camera of the device, a first direct current voltage level; and
   emit, by a camera sensor of the camera, the GPIO signal at the first direct current voltage level to trigger the transition of the set of elements.

21. The method of claim 1, wherein the set of elements comprises a set of liquid crystal-elements.

22. The apparatus of claim 12, wherein the set of elements comprises a set of liquid crystal-elements.

23. The device of claim 19, wherein the set of elements comprises a set of liquid crystal-elements.

* * * * *